Patented Jan. 15, 1946

2,393,154

UNITED STATES PATENT OFFICE 2,393,154

PETROLEUM PRODUCTS

Joe L. Franklin, Jr., Goose Creek, Tex., assignor to Standard Oil Development Company, a corporation of Delaware No Drawing. Application July 28, 1942, Serial No. 452,589

4 Claims. (Cl. 44—74)

The present invention relates to improvements in the art of alkylating olefins with isoparaffins and more particularly it relates to the alkylation of olefins with isoparaffins in the presence of sulfuric acid catalyst, in which process the last traces of sulfuric acid, either in combined form or in solution, are substantially completely removed from the finished alkylate.

In alkylating an olefin with an isoparaffin, for example butylene with isobutane in the presence of strong sulfuric acid such as acid having a strength of from about 95% to 98% and at the usual temperatures, say in the neighborhood of 35° F., the usual practice employed in recovering the alkylate from the reaction zone is to discharge the "emulsion" consisting of sulfuric acid, alkylate, unreacted isoparaffin, etc., into a settling zone; the emulsion is then permitted to stratify in said settling zone into an upper hydrocarbon layer containing the alkylation product or "alkylate," as it is often called, and a lower sulfuric acid layer. The upper layer is drawn off and purified by washing, neutralizing and distilling to recover the desired finished alkylate.

However, it has been found that the most careful washing with caustic soda solution and/or water has heretofore failed to remove from the product acidic substances formed in the reaction or present during it. Hence when the washed and caustic soda treated alkylation product was distilled to separate the $C_4$ and $C_5$ hydrocarbons including butanes and isopentane, the distillation process resulted in fouling and corrosion of distillation equipment. The careful washing and/or caustic soda treatment of the raw alkylation product had little or no effect in preventing corrosion and/or fouling of the equipment during the distillation of the said alkylate.

I have now observed that in the alkylate there are sulfuric acid esters or other acidic compounds and that these apparently pass through and are not removed during washing and/or treatment of the alkylate with a caustic soda solution or an equivalent alkaline reacting substance. In any event there is probably present in the alkylate product, prior to and during distillation, derivatives of sulfuric acid. Tests indicate that these derivatives undergo decomposition during the distillation liberating acid reacting substances, and it is believed that these latter substances are responsible for the difficulties experienced in plant distillation of the alkylate or alkylation products.

The main object of my present invention is to produce an alkylation product which may be distilled in ordinary plant or other metallic distillation equipment including transfer pipes, heat exchangers, reboilers, condenser coils and the like without causing corrosion and/or fouling of said equipment.

A further object of my present invention is to render a branched chain paraffin hydrocarbon, produced from an isoparaffin and an olefin in the presence of an acid catalyst such as sulfuric, non-corrosive toward metallic surfaces which it may contact for extended periods of time at elevated temperatures such as are encountered in the distillation of the alkylation product.

Other and further objects of my invention will appear from the following more detailed description and claims.

Tests have shown that the decomposition of the corrosion forming materials in the alkylate can be retarded or, in some instances, completely eliminated by adding to the alkylate a small quantity of a hydrocarbon-soluble base such as an aliphatic or aromatic amine. The tests were made by flash vaporizing, at atmospheric temperatures, the butane from an alkylate and adding 0.001 to 0.04 volume per cent of the base to the debutanized alkylate. Samples of the inhibited and uninhibited alkylates were then heated to temperatures comparable to those experienced in commercial plant reboilers and preheaters or to a maximum of 400° F. (if fouling did not occur at normal plant temperatures), and observations were made of the temperature at which formation of $SO_2$ and fouling deposit began. The residue remaining after heating to 400° F. was tested for acidity and sulfate ion. The experiments indicated that a minimum of 0.001 volume per cent or a maximum of 0.01 volume per cent was desirable for reduction or elimination of the decomposition during heating. The above quantities are the most desirable, but it is possible to use quantities ranging from 0.001 to 0.1 volume per cent. The experimental results are presented in the following examples:

EXAMPLE I

ALKYLATE DEBUTANIZED AND TESTED BY HEATING IN GLASS

|  | Uninhibited | +0.04% triamylamine | +0.04% aniline |
|---|---|---|---|
| Fouling temperature, ° F | 220 | None at 310 | None at 310. |

EXAMPLE II

ALKYLATE DEBUTANIZED, CAUSTIC SODA SOLUTION AND WATER WASHED AND TESTED BY HEATING IN GLASS

|  | Un-inhibited | +0.04% ethanol-amine | +0.04% aniline | +0.04% triamyl-amine |
|---|---|---|---|---|
| Fouling temperature, °F. | 260 | None at 300. | None at 290. | None at 310. |

EXAMPLE III

ALKYLATE DEBUTANIZED, CAUSTIC SODA SOLUTION AND WATER WASHED AND TESTED BY HEATING IN GLASS

|  | Uninhibited | +Aniline | | | +Triamylamine | |
|---|---|---|---|---|---|---|
|  |  | 0.04%, fouled | 0.01%, fouled | 0.005%, fouled | 0.01%, none | 0.005%, slight |
| Fouling temperature, °F. | 200 | At 320 | At 295 | At 280 | At 320 | At 325 |

EXAMPLE IV

ALKYLATE DEBUTANIZED, CAUSTIC SODA SOLUTION AND WATER WASHED AND DISTILLED IN METALLIC EQUIPMENT WITH AND WITHOUT STEAM INJECTION

*Dry distillation*

| Uninhibited | | | +0.01% triethanolamine | | |
|---|---|---|---|---|---|
| Still temperature, °F. | SO$_2$ in the distillate | Still fouled | Still temperature, °F. | SO$_2$ in the distillate | Still fouled |
| 208 | No | No | 200 | No | No. |
| 220 | Yes | do | 340 | Yes | Slight. |
| 240 | Yes | Heavily | 400 | Yes | Do. |
| 400 | Yes | do |  |  |  |

*Steam distillation*

| Uninhibited | | | +0.01% triethanolamine | | |
|---|---|---|---|---|---|
| Still temperature, °F. | SO$_2$ in the distillate | Still fouled | Still temperature, °F. | SO$_2$ in the distillate | Still fouled |
| 200 | No | No | 200 | No | No. |
| 260 | Yes | Yes | 280 | Yes | Slight.[1] |
| 370 | Yes | Yes | 390 | Yes | Do. |

[1] Slight amount of fouling appeared at 280° F. which remained until the end of the distillation; fouling of the uninhibited sample was appreciable at 260° F. and became heavier as distillation continued.

It will be noted from the above tests that the addition of an amine rendered the alkylate product (which was that made by reacting isobutane and butylene in the presence of sulfuric acid) passive toward metallic distillation equipment or at least retarded the corrosive and fouling tendency of the said alkylate.

The importance of this invention will be apparent when it is realized that, in operating a fractionating column for the debutanization and distillation of an alkylate, the temperatures which are reached in various parts of the equipment, such as reboilers, heat exchangers, and the like, are often of the order of 400° F. or higher, and these conditions are conducive, to say the least, toward decomposition of esters of sulfuric acid and/or other acid-containing bodies to liberate substances of a corrosive nature. Obviously, this is a serious problem since it usually causes both weakening and fouling of the metal equipment. Also, the presence of uninhibited acidic bodies in the finished alkylate may cause precipitation of lead compounds, particularly in storage or in transit, where lead tetraethyl is added to an alkylate-containing aviation gasoline or automotive fuel.

Although the description given with respect to the examples of my invention indicates that the amine was added after debutanization of the raw alkylation product, I wish to make it clear that the amine may be added at any point in the operation after the alkylate has been separated from the alkylation catalyst and prior to any distillation step where corrosion and/or fouling may occur. Preferably, I separate the raw alkylate from the alkylation catalyst, wash the alkylate with a dilute alkaline solution and with water, and then I mix the amine with the separated alkylate before subjecting the mixture to debutanization and distillation. Addition of the amine before the washing step is not desirable since this class of compounds is generally soluble in water and would be removed from the alkylate during the washing operation.

Now while it appears that the underlying cause of the corrosive tendency of alkylate produced in the presence of an acid catalyst is due to the presence of acid esters in the said alkylate, I do not wish to be bound by any theories regarding the cause of the corrosive nature of the alkylate but shall rely on the observed facts hereinbefore set forth particularly as to the results I have accomplished in the prevention or retardation of corrosion and/or fouling of distillation equipment during the processing, particularly the final stages thereof, of alkylation products. Furthermore, my improvements are applicable to correct or at least ameliorate the corrosive and fouling tendencies of branched chain paraffinic hydrocarbons whether they be produced in the presence of sulfuric acid alone, admixed with other substances such as $H_3PO_4$, $P_2O_5$, HCl, $NiSO_4$ or whether the acid catalyst be an acid other than sulfuric acid such as HCl, HF, $H_3PO_4$, or whether it be catalysts such as $P_2O_5$, $BF_3$ and $H_2O$, or the like. Of course, strong sulfuric acid is the most satisfactory catalyst for isobutane-butylene alkylation, all factors considered, and this is true also for the alkylation of normally liquid olefins.

To review briefly, my present invention is directed toward immunizing metallic equipment against corrosion and fouling when it is contacted with raw alkylate, comprising the reaction product of isoparaffins and olefins produced in the presence of an acid catalyst, by adding to the alkali- and water-washed raw alkylate (after removal of the washing and/or treating agent) a small quantity of an aromatic-, an aliphatic- or an alkanol-amine. I may use for this purpose any amine which is soluble even slightly in the said alkylate.

I wish to include within the scope of the appended claims all subject matter expressly disclosed herein and included also by reasonable inference, excluding only that required by the terms of the appended claims.

What I claim is:

1. In the treatment of alkylate product obtained by reacting an olefin and an isoparaffin in the presence of an acid catalyst including the steps of separating the alkylate product from the catalyst, neutralizing, and water washing and subsequently subjecting the alkylate to a distillation step, the step of rendering the alkylate non-corrosive to metal which comprises the step of adding a small quantity of an amine to the neutralized water washed alkylate prior to the distillation step.

2. The process specified in claim 1 in which the amine is aromatic.

3. The process as set forth in claim 1 in which the amine is aliphatic.

4. The process as set forth in claim 1 in which the quantity of amine is in the range between 0.001 and 0.1 volume per cent based on the debutanized alkylate.

JOE L. FRANKLIN, Jr.